United States Patent [19]

Nolde

[11] Patent Number: 5,920,615
[45] Date of Patent: Jul. 6, 1999

[54] TELECOMMUNICATIONS SWITCH

[75] Inventor: Keith Eric Nolde, Suffolk, United Kingdom

[73] Assignee: British Telecommunications public limited company, London, United Kingdom

[21] Appl. No.: 08/622,344

[22] Filed: Mar. 25, 1996

[30] Foreign Application Priority Data

Oct. 19, 1995 [EP] European Pat. Off. ............. 95307468

[51] Int. Cl.⁶ .......................... H04M 1/56; H04M 15/06; H04M 13/00

[52] U.S. Cl. .......................... 379/142; 379/167; 379/171; 379/177; 379/164

[58] Field of Search .................... 379/167, 168, 379/171, 172, 173, 177, 179, 182, 183, 184, 188, 189, 199, 200, 142, 93.23, 93.17, 354, 127, 164, 198

[56] References Cited

U.S. PATENT DOCUMENTS

| | | | |
|---|---|---|---|
| 3,649,761 | 3/1972 | Bush et al. .............................. | 379/156 |
| 4,633,039 | 12/1986 | Holden ....................................... | 379/32 |
| 4,703,325 | 10/1987 | Chamberlin et al. .................... | 340/825 |
| 4,723,271 | 2/1988 | Grundtisch .............................. | 379/181 |
| 4,899,378 | 2/1990 | Hamer ...................................... | 379/374 |
| 4,926,470 | 5/1990 | Sanford . | |
| 5,029,196 | 7/1991 | Morganstein . | |
| 5,222,122 | 6/1993 | Hamilton et al. ......................... | 379/32 |
| 5,267,307 | 11/1993 | Izumi et al. .............................. | 379/354 |
| 5,268,958 | 12/1993 | Nakano . | |
| 5,333,190 | 7/1994 | Eyster ....................................... | 379/375 |
| 5,375,163 | 12/1994 | Kamimoto ................................ | 379/31 |
| 5,425,089 | 6/1995 | Chan et al. . | |
| 5,454,032 | 9/1995 | Pinard et al. ............................. | 379/167 |
| 5,467,388 | 11/1995 | Redd, Jr. et al. ......................... | 379/196 |
| 5,479,493 | 12/1995 | Baker et al. .............................. | 379/127 |
| 5,550,900 | 8/1996 | Ensor et al. .............................. | 379/67 |
| 5,596,631 | 1/1997 | Chen ......................................... | 379/177 |
| 5,602,908 | 2/1997 | Fan ........................................... | 379/142 |
| 5,623,532 | 4/1997 | Houde et al. ............................. | 379/58 |
| 5,623,537 | 4/1997 | Ensor et al. .............................. | 379/142 |

FOREIGN PATENT DOCUMENTS

| | | |
|---|---|---|
| 0216381 | 4/1987 | European Pat. Off. . |
| WO 86/06570 | 11/1986 | WIPO . |
| WO 94/23526 | 10/1994 | WIPO . |

OTHER PUBLICATIONS

Patent Abstracts of Japan, vol. 17, No. 620 (E–1460), Nov. 16, 1993 & JP–A–05 191497 (Fujitsu Ltd) Jul. 30, 1993.

IBM Technical Disclosure Bulletin, vol. 36, No. 6B, Jun. 1993, New York US, p. 31, XP 000377289 "Filtering Phone Calls".

*Primary Examiner*—Curtis A. Kuntz
*Assistant Examiner*—Rexford N. Barnie
*Attorney, Agent, or Firm*—Nixon & Vanderhye P.C.

[57] ABSTRACT

A switching system for inclusion in domestic premises includes a master socket for connection to network termination equipment (e.g., wall socket) and for connection to a plurality of slave sockets each of which may be connected to normal communications apparatus such as telephone, fax or answering machines not shown. On receipt of an incoming telephone call from the network the master socket uses signals which identify the source of the call (calling line identity (CLI)) signals to determine which of the slaves is to be called. Using only four wires (i.e., the normal extension wiring pattern) the master socket can signal individual slave sockets to switch in or out of circuit so that a normal domestic telephony arrangement may be simply and economically converted to include switching. Various protective options and alternative calling patterns in event of non-answer can also be provided by the master socket including options for allowing communication between two individual extensions without utilizing the main exchange line system.

13 Claims, 7 Drawing Sheets

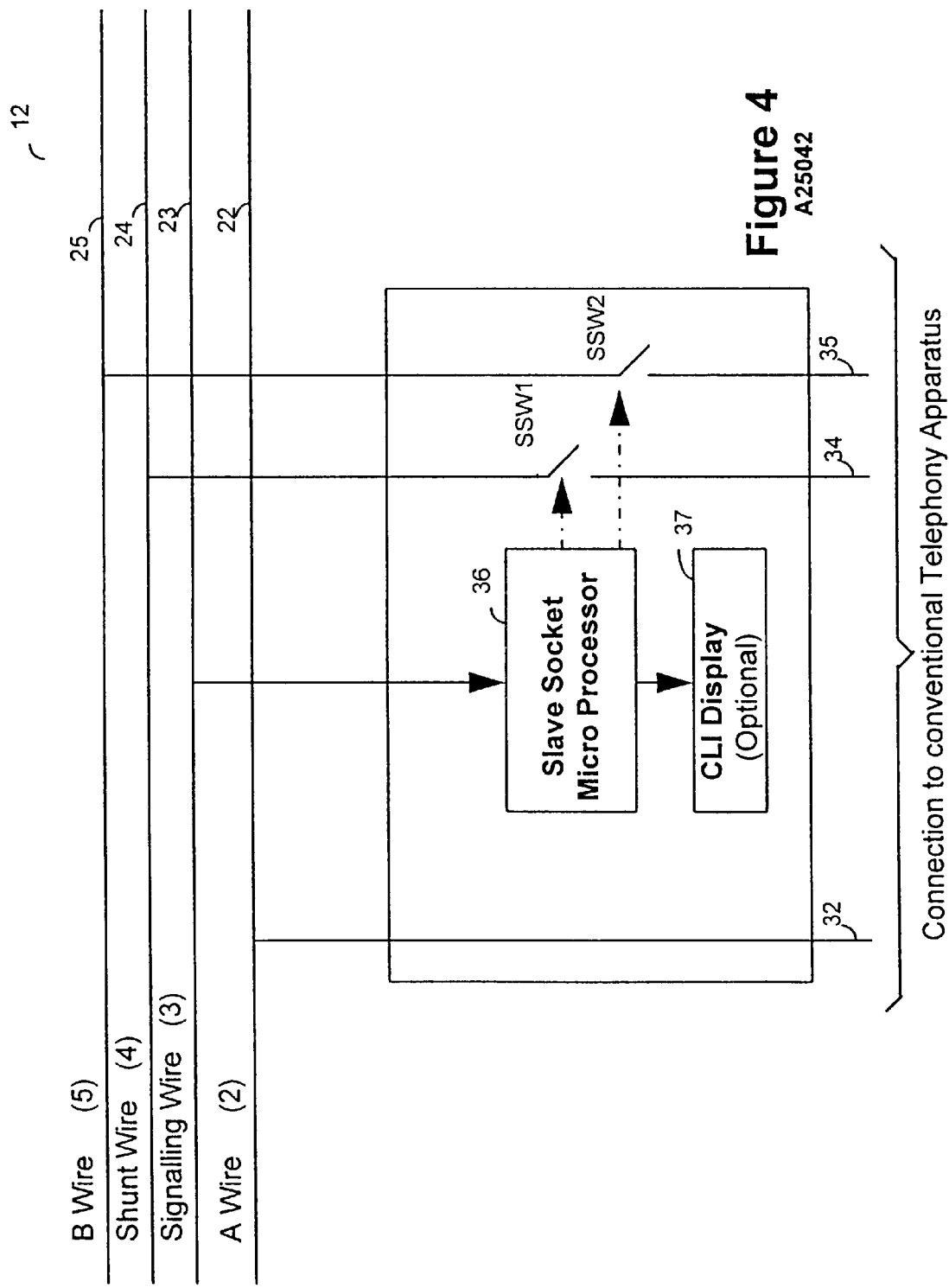

A25042

TELECOMMUNICATIONS SWITCH

BACKGROUND OF THE INVENTION

1. Field of the Invention

The present invention relates to a telecommunications switch and in particular to a telecommunications switching system for use on a single PSTN line for terminating calls at a plurality or multiplicity of specified destination instruments.

2. Related Art

It is often the case that a telephone line representing a single telephone number is shared by several telephone instruments at one destination. In a commercial environment small exchange switching capability can be provided such that either an additional digit or automatic switching can direct calls to different telephone instruments for different persons or purposes. This may require substantial wiring and heavy investment in equipment and/or communication network capabilities.

In domestic situations or for small businesses for example, it is common to run a single loop of, say, four wires to connect a number of telephone sockets in parallel. Thus any incoming call will cause all connected telephone instruments on the loop to activate. Providing additional telephone lines is expensive for the customer and inefficient for the network operator and may cause difficulty where a single originating call is passed among members of the same family. As an alternative a small switch would require additional digits to be transmitted through the network to select the destination telephone. Such transmission may not be possible across the telephone network until the destination line has answered a ringing signal or else the network operator may not cause connection of a speech path.

SUMMARY OF THE INVENTION

The present invention seeks to overcome some of the difficulties of providing selectable telephony within consumer premises without involving substantial investment in direct switching of metallic paths.

According to the present invention there is provided an interface for connection to a line to a telecommunications switching network comprising means responsive to source identification signalling received by way of the telecommunications line to cause output of signals on a first wire identifying one of a plurality of output terminals to which communications apparatus may be connected, means in each of said terminals responsive to signalling on the first wire to effect connection of the apparatus to call alert and speech path connections whereby calls received from a telecommunications system may be selectively directed to specific destination apparatus without requiring a specific network telephone digit transmission.

Preferably the system includes ringing generator means to allow selective interconnection of a plurality of extension instruments without requiring connection to the external network.

The system may be responsive to switch incoming calls selectively to more than one extension instrument and/or to cause instruments to be alerted in a predetermined pattern if an incoming call is not answered within a predetermined period.

The system preferably comprises a master socket including a master controller which is responsive to received signalling and a plurality of slave socket arrangements each containing an intelligent control system. The master control system may be arranged to transmit signals identifying the source as received from the network to the called slave controller to permit display of the call source to the receiving instrument.

BRIEF DESCRIPTION OF THE DRAWINGS

A switching system in accordance with the invention will now be described by way of example only with reference to the accompanying drawings of which:

FIG. 4 shows a slave socket of the switch of the invention;

DETAILED DESCRIPTION OF EXEMPLARY EMBODIMENTS

Figure 1:
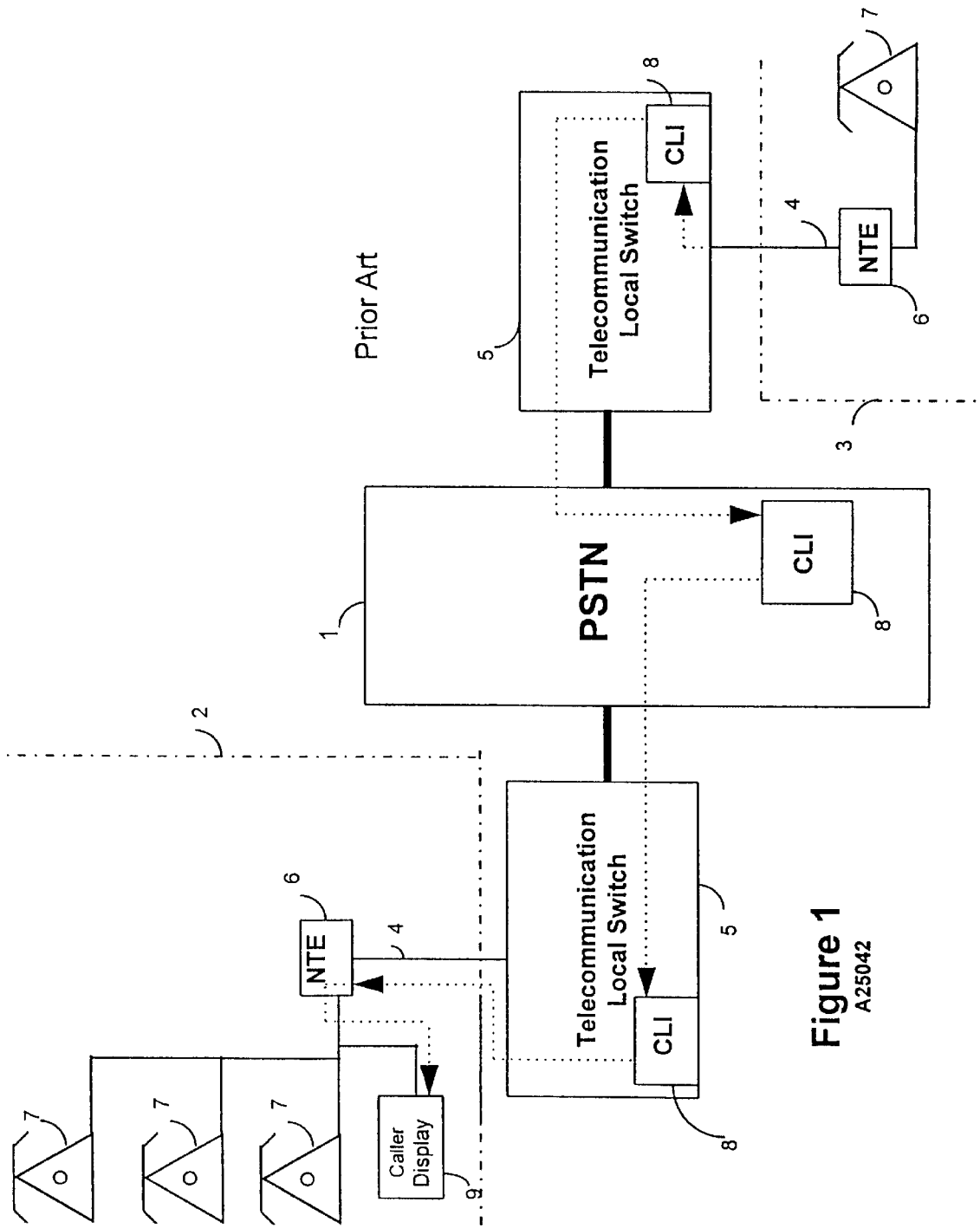
FIG. 1 is a schematic diagram of a telecommunications network of known kind.

Referring to FIG. 1, the public switched telephone network 1 comprises a number of switches designed to connect telecommunications calls between customer premises schematically represented at 2 and 3. The customer premises, for example 3 have a connection 4 to a local communications switch 5. The local communications link 4, which may be of any suitable kind such as optical fibre, copper or radio link, terminates in the customer premises 2,3 on network termination equipment (NTE) 6 usually in the form of a socket to which equipment such as telephone 7 or fax machines, modems and the like can be connected.

Customer premises may have a number of communications apparatus connected to their respective NTEs 6 usually by way of "slave" sockets connected in parallel to the NTE 6. Such an arrangement is shown for customer premises 2. Thus, when a call is originated to the customer premises 2, all of the devices 7 will be alerted by receiving ringing current by way of the respective communications switch 5 and link 4.

A feature of the proprietor's network is the use of digital signalling techniques to pass across the network the identity of the originating telephone call. For example, if the call originates on the line 4 connecting the customer premises 3 a calling line identity unit (CLI) 8 identifies the source of the call. The CLI is used for example for billing purposes and for determining class of service for the particular originating line. As indicated by the dotted arrows, the CLI is transferred into the PSTN in known manner during the course of the call set up. CLI is transferred by way of an associated data channel through the PSTN using a suitable protocol and, for example, the CCITT Signalling System number 7 which is in common use for transferring information between digital main switching units in the PSTN 1 and to the local switches 5. When the PSTN has received sufficient routing information to identify another telephone line, for example the line 4 to customer premises 2, the destination local switch 5 is interrogated to determine the status of the line 4. Assuming that the line 4 is free the local switch 5 is arranged to cause alerting signals, ie., ringing signals to activate telecommunications apparatus 7 connected to the customer's NTE 6. However, prior to causing ringing current to be applied to the line 4, the destination exchange 5 may provide to the customer an indication of the CLI of the originating caller's line. This alerting is carried out by effecting a line reversal, that is applying reverse voltage to the "A and B" legs of the line 4 followed by a burst of signalling carrying the CLI information. If the customer premises 2 is equipped with a caller display unit 9, which is also connected directly in parallel with the telephone instruments 7, then the number of the originating caller may be displayed if it is available within the network.

Figure 2:
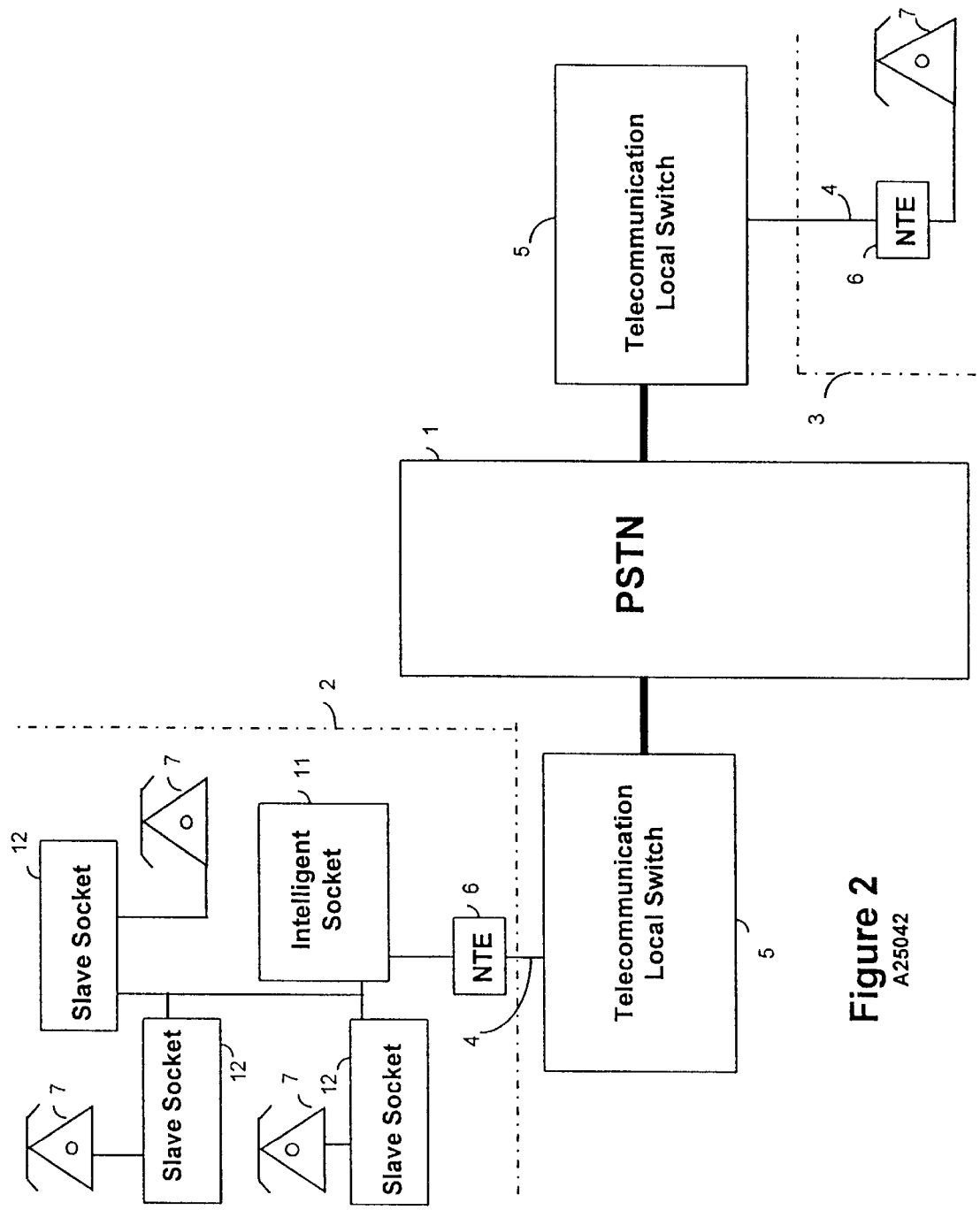
FIG. 2 is a block schematic diagram of a telecommunications network showing the location of the switch and component parts thereof in accordance with the invention.

Turning now to FIG. 2, the switch of the present invention is arranged for connection between the NTE 6 and the telephone instruments 7 (or other telecommunications apparatus as appropriate) and is shown as being present in the customer premises 2. The system effectively comprises an intelligent master socket 11 and as many slave sockets 12 as may be required for connection using the existing domestic extension wiring 10 subject to limitations imposed by signalling capability. The system is shown as connected at the customer premises 2 although it will be appreciated that any number of customer premises may have respective master sockets 11 and slave sockets 12 to make up a local domestic switch.

Figure 3:
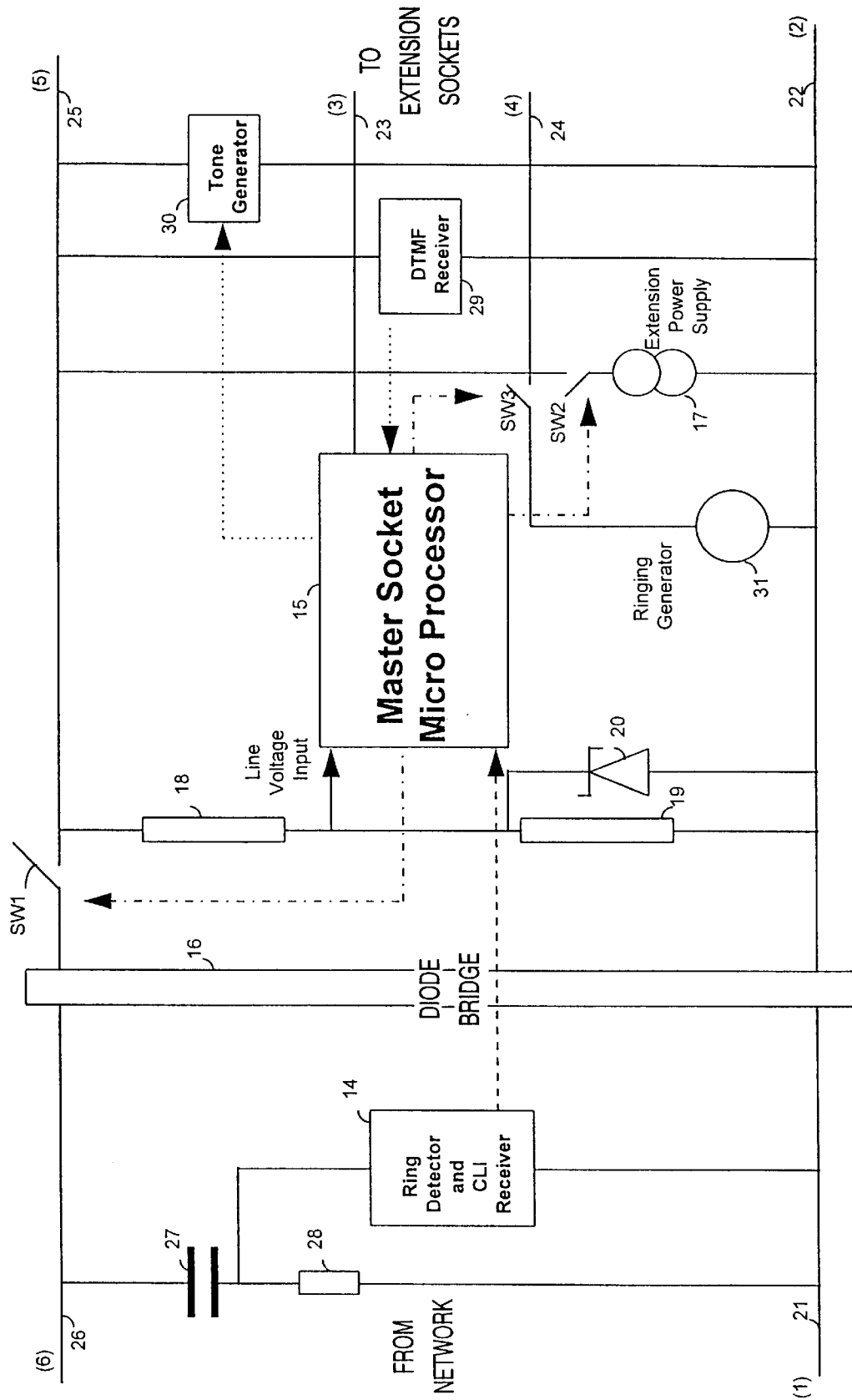
FIG. 3 shows an intelligent master socket of the switch of the invention.

Referring also to FIG. 3, in which the master socket 11 of FIG. 2 is shown in greater detail, the A and B legs of the telephone line 4 are connected via the NTE 6 to the input terminals 21 and 26 of the master socket 11. The leads 21 and 26 correspond to connections 1 and 6 of the UK network termination equipment socket used by the proprietor of the current application. Such master sockets and the slave sockets used and described hereinafter are compatible with the 4-wire master/slave wiring arrangements as described with respect to FIG. 9 of British Standard number BS6305. A capacitor resistor chain 27, 28 across the A and B legs 21, 26 provide a path for ringing and CLI signalling from the PSTN network to feed a detector receiver 14 which, when alerted, passes information to a microprocessor 15. The information passed to the microprocessor comprises the CLI (if any) and an indication that there is an incoming call.

A diode bridge 16 of known form is used to maintain the correct voltage orientation of the lines 22, 35 which do not need to see line reversals.

The line 26 is disconnected from line 25 by a switch SW1 which is controlled from the microprocessor 15.

Power for both the master and slave sockets 11 and 12 is provided via a local or mains derived power supply represented at 17, which feeds a controlled dc voltage to the lines 22, 25 which correspond to pins 2 and 5 of the proprietor's standard network termination equipment socket. However, in the idle state, that is when no call is in progress either internally or externally of the premises 2, SW1 is closed while contact SW2 and SW3 remain open. Thus only the master microprocessor is on line and remains powered.

A resistor chain 18, 19, protected by zener diode 20, allows the master socket microprocessor to monitor the line voltage. The reason for monitoring will become apparent in subsequent description.

The master unit also includes a dual tone multi-frequency receiver 29, a tone generator 30 and a local ringing generator 31.

The output from the ringing generator 31 is controlled by the switch SW3 from the microprocessor 15 and outputs on line 24 corresponding to line 4 of the proprietor's standard network termination equipment socket. The remaining pin of the proprietor's standard network termination equipment (pin 3) is used as a signalling output wire by the master socket using line 23.

Referring additionally to FIG. 4, the lines 22 to 25 correspond to pins 2, 3, 4 and 5 of a standard "slave" socket. All of the extension sockets 12 are identical in terms of hardware. The output of the slave socket, which may be terminated in a standard plugable socket arrangement uses the connection pin equivalents 2, 4 and 5 of the standard UK slave socket noted here as lines 32 to 35. The A wire, line 22, from the master socket is directly connected to the output line 32. The ringing wire 24 and the B leg 25 are respectively connected to lines 34 and 35 by slave socket switches SSW1 and SSW2 controlled by a slave microprocessor 36 which is responsive to instructions received on the signalling circuit wire 23 from the master microprocessor 15.

In addition to the microprocessor and switch arrangements shown in FIG. 4, the slave socket 12 may optionally include a liquid crystal display or other display unit for showing calling line identity 37.

In order to avoid need for continuous line powering of the slave sockets, the switches SSW1 and SSW2 are latching relays which are driven between the open and closed states and will remain in the designated state until a further instruction is received.

In order to understand the operation of the system shown in customer premises 2 consideration is now given to some of the potential operational states of the telephone instruments 7, the NTE 6 and the incoming line 4.

First considering the idle state, the master socket has SW1 closed with SW2 and SW3 open. Each of the slave sockets will have SSW2 closed and SSW1 open so that the A and B wires of the communications line are connected to all extensions. Since the switches SSW1 in each of the slave sockets are open, the incoming ringing signal will not operate any signalling device in connected telephone apparatus. In this condition the microprocessors 36 are effectively dormant.

Figure 5A:
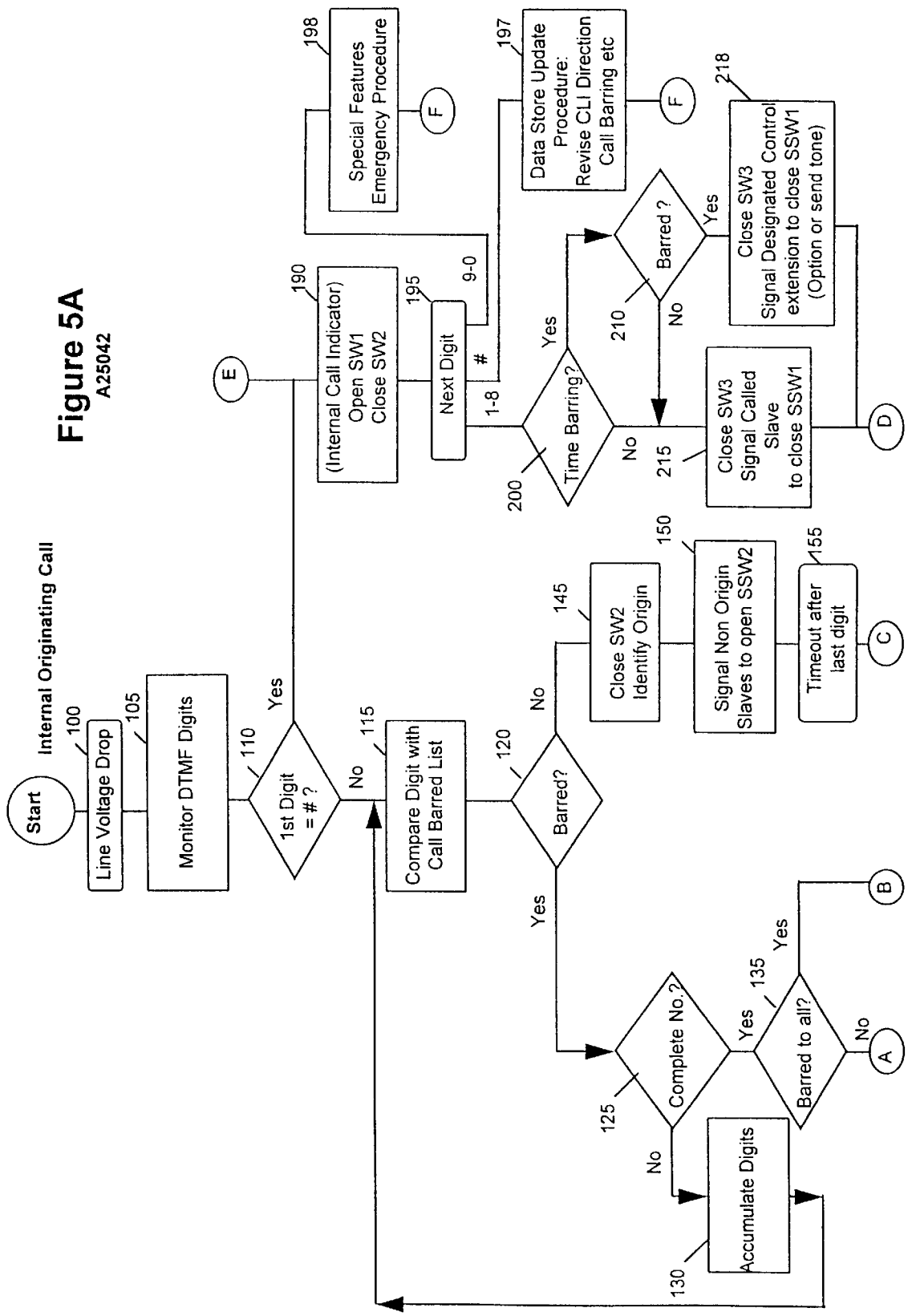
FIGS. 5a and 5b form a flow chart describing the operation of the processor of the intelligent master socket of FIG. 3 during an internal originating call.

Consider now an outgoing telephone call from one of the telephone instruments 7 to the NTE 6. When any of the instruments 7 is lifted as the switch SSW2 is closed the through loop from the line 32 to 35 via lines 22 to 25, SW1 closed and lines 21 and 26 is applied to the network in known manner. This will cause dial tone to be returned from the local exchange. At the same time the line voltage will collapse from 50 volts nominal to 12 volts approximately and this loop is detected by the master socket microprocessor. This is shown at step 100 of FIG. 5a to which reference is additionally made.

The microprocessor 15 causes the DTMF receiver 29 to come on line to enable a check to be carried out of the digital transmission from the telephone instrument 7. The transmission from any of the instruments 7 will be forwarded directly to the A and B legs 21 and 26 and will also be monitored by the microprocessor 15. If the first signalled digits do not indicate a call one of the internal extensions then no further action is taken by the microprocessor and the call proceeds through the PSTN under the control of the telephone instrument 7 (step 105) in known manner.

However, if the first digit detected at 110 corresponds with the first digit of one or more numbers to which calls from any of the slave sockets 11 may be barred then after the comparison at step 115 indicating at step 120 that a potentially barred call has been attempted the microprocessor 15 accumulates each subsequent digit at step 130 and repeats the comparison with subsequent digits in a call barred list.

If at any point in the transmission of digits from the telephone instrument 7 the microprocessor determines at step 120 that the called is not barred then by step 145 line power is provided to activate the microprocessors 36 in each of the accompanying slave units. This will permit the slave unit microprocessors to be controlled so that with the exception of the slave socket from which the call originates each of the slaves may be caused to open switches SSW2 at step 150 to provide privacy for the call from the other extensions. The microprocessor 15 continues to monitor the digits transmitted by the connected telephone instruments 7 until a predetermined time out period after the last digit indicates that transmission has been completed. Once the time out has expired at step 155 the microprocessor continues to monitor for either further DTMF signalling from the telephone instrument (which is likely to indicate requirement for transferring of a call to a different extension) or for a change in the line voltage indicating that the call has been cleared down. If the call is to be transferred then the DTMF signalling indicating such will be monitored at step 165 and transfer of the call will occur in the same manner as a standard call to another extension.

Now if an attempt is made to call a number to which call barring applies, once the microprocessor 15 has identified that the complete number has been received at step 125 a further interrogation process occurs whereby, at step 135, data is examined to determine whether the particular call is barred to all extensions. If not, at step 140, the microprocessor 15 closes switch SW2 to provide power to the microprocessors 36 in each of the slave sockets to enable the origin of the call to be identified. Step 170 compares the identified originating slave with the call barred list to determine whether the call is barred to the particular slave socket of origin and if not at step 175 causing the non calling slaves to open their respective switches SSW2 and the call is treated as hereinbefore described.

If either at step 135 or step 170 it is determined that the call attempt is barred then the microprocessor cause switches SW1 to be opened thereby releasing the network connection at step 180 and optionally causes an internal call to be set up as hereinbefore described to a designated telephone extension. Optionally an attempt to make a call to a barred number may simply result in a tone being returned to the calling slave extension.

Now if the first signal digits (step 110) from the looping telephone instrument 7 indicate an internal call, for example hash followed by an extension number (128), the microprocessor 15 causes switch SW1 to be opened thereby releasing the connection to the network. The microprocessor 15 now causes switch SW2 to be closed (step 190) thereby providing power to the lines 22, 25 which causes each of the microprocessors 36 in the slave sockets 12 to turn on and commence monitoring the signal wire 23. Using an eight bit code comprising a start bit, eight signalling bits and a stop bit using dc signalling in known manner the master processor now forwards signals by way of the connection 23 which indicate to the slave microprocessors 36 which telephone instrument 7 is to be called.

At step 200 the microprocessor 15 determines whether time barring is in operation and if so compares the originating and destination extension numbers with the time barred list to determine if the call is permitted. If the call is permitted as determined at step 210 then the microprocessor 15 causes switch SW3 to be closed at step 215 and signals the called slave to close its respective switch SSW1.

The microprocessors 36 in the called slave socket 12 now causes its respective SSW1 to close while the microprocessors in non-designated slave sockets may be arranged to cause the switch SSW2, associated therewith, to open thereby providing privacy for the extension-to-extension call.

The microprocessor 15 in the master socket may now cause the switch SW3 to be closed thereby providing a ringing signal by way of line 24 to line 34 to effect ringing of the required slave extension.

When the called extension answers (step 220) the line voltage input to the microprocessor 15 will again drop and this causes the microprocessor 15 to open switch SW3 and to signal the respective microprocessors 36 to open SSW1 (step 225). If the microprocessor 15 identifies a line voltage change arising from the call being cleared before answer then it will proceed into the clearance sequence. The sequence may also be arrived at from the earlier set up arrangements for calls to extensions which have been successfully answered at step 225 and also calls to the external network at set up at step 160. Thus at step 230 all slave sockets microprocessors 36 are instructed to close their respective switches SSW2. Once this instruction has been forwarded the microprocessor 15 causes switch SW2 to be opened which effectively closes the microprocessors in the slave sockets thereby preventing power wastage. At the same time SW1 the network switch is closed if it has been previously opened.

Again if a time barred call is attempted at step 210 the microprocessor is arranged to substitute a call to the designated control extension as hereinbefore described with reference to calls barred externally, this is shown at step 218.

Considering the second digit of an internal call at step 195, for the purpose of description it has been assumed that a maximum of eight extensions will be provided in the present system. The remaining digits 9 and 0 are reserved to provide special features within the system while the digit # as a second digit following the internal extension indication at step 190 is used to indicate a requirement for updating the data store at, for example, step 197 thus allowing updating of the CLI direction instructions herein described and modifying call barring or time barring arrangements. The digit 9 may be used to indicate an emergency procedure call, for example to be used by the designated control extension to cause all of the extensions to be rung simultaneously in the event of an emergency, this step shown as step 198 is for example only and other special features may be specifically programmed at the customer's request.

Figure 6:
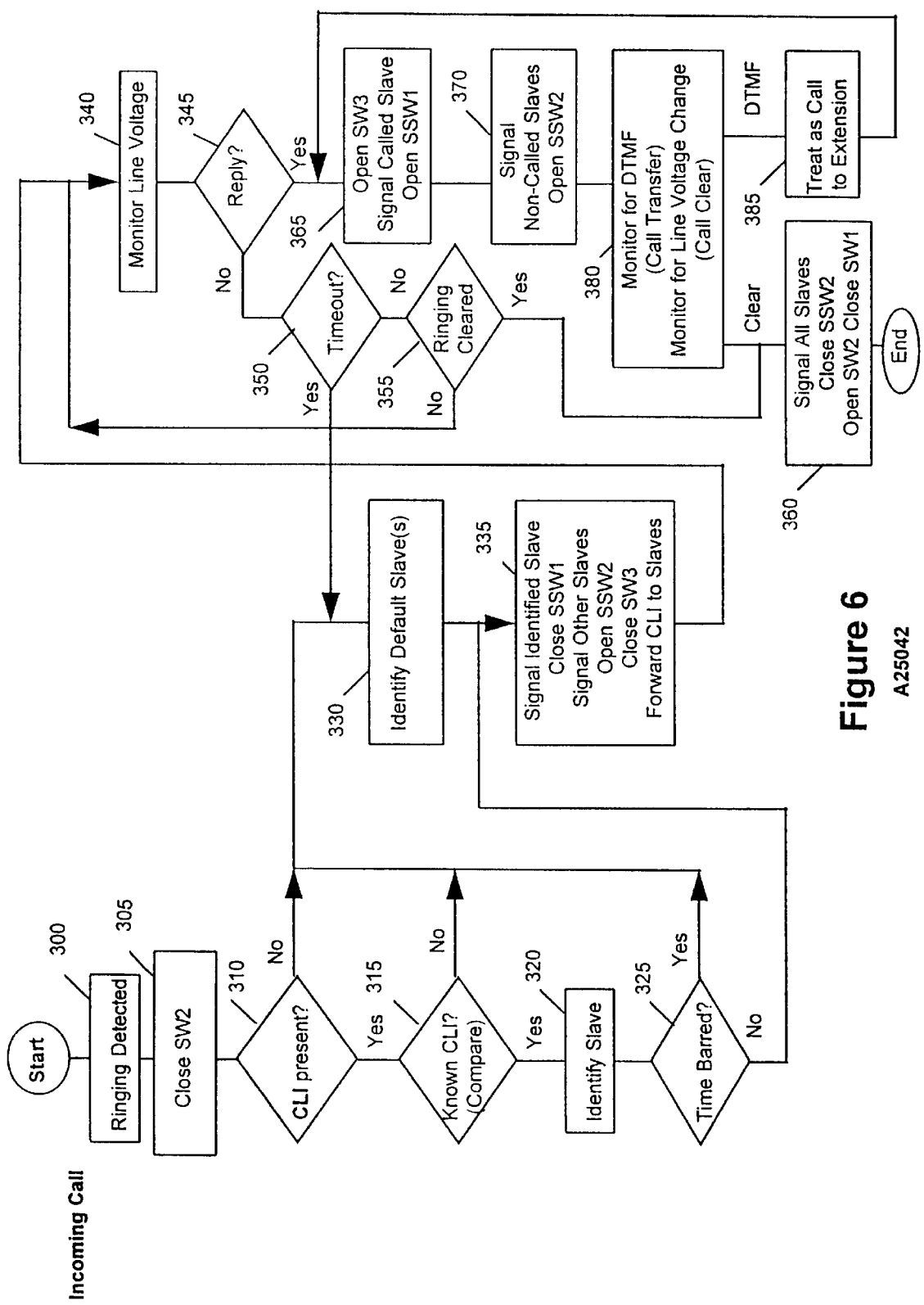
FIG. 6 is a flow chart showing the operation of the processor of FIG. 3 during an externally originating or incoming call.

Consider now an incoming call, referring now to FIG. 6, once ringing is detected at step 300 the microprocessor 15 having been alerted by the ringing detector 14 causes switch SW2 to be closed to power up the microprocessors 36 in the slave sockets. A check on CLI also received from the detector 14 is now carried out at step 310 and assuming that CLI is present at step 315 the CLI is compared with a listing of known calling line identifiers. Where for example CLI is not available (step 310) from the network either because the number has been withheld by the originating caller or because the originating line 4 is not connected to a network which supports CLI signalling to the PSTN 1. The microprocessor 15 may have been programmed to ring all of the extensions on each of the slave sockets 12 or to ring one or more nominated sockets this is identified at step 330. Now at step 335, to effect this, the microprocessor 15 uses the signalling line 23 to indicate to the microprocessors which is to close the respective switch SSWL and, if appropriate, which is to open switches SSW2. The switch SW1 will remain open until one of the called extensions is answered.

Again, the microprocessor 15 uses the switches SW2 and SW3 to wake up the slave socket microprocessors and to provide ringing current. During the course of the waiting period between a call arriving from the network and one of the extensions answering the ring detector 14 will forward a signal to the microprocessor 15 if the network call is dropped prior to being answered (step 355). This will in turn cause the microprocessor 15 to open switch SW3 and to clear down by signalling the microprocessors 36 to re-open their respective switches SSW1 (step 360).

Figure 5B:
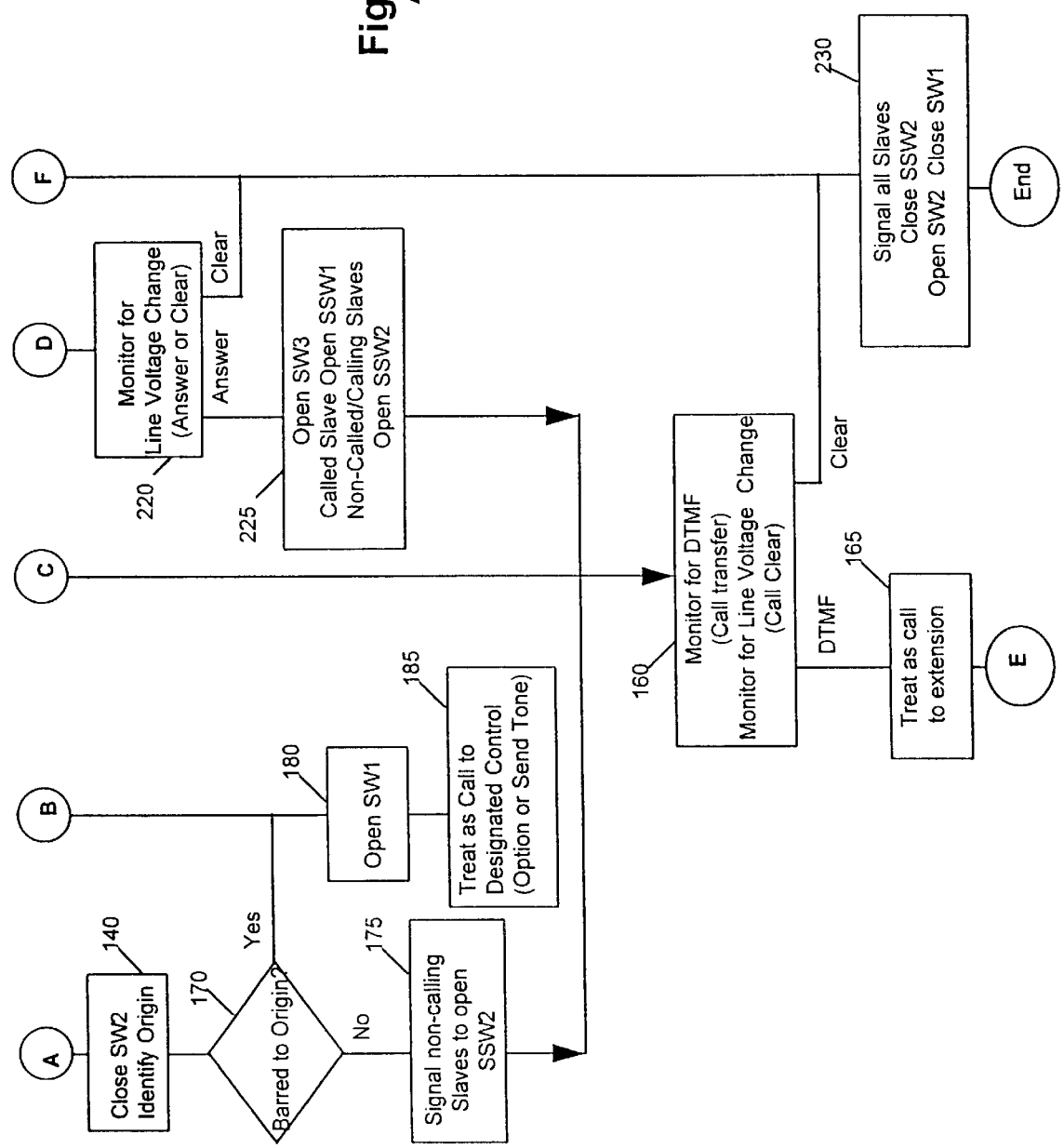

If the network forwards a CLI prior to ringing, the CLI receiver 14 will pass the received CLI to the microprocessor 15. If the CLI is from a known source (step 315), that is one for which the microprocessor has been previously configured, then the call may be set up by activating SSW1 in the nominated slave socket and causing SSW2s in the non-nominated sockets to be opened. The respective slave is identified at step 320 and unless it is timed barred (step 325) as previously described with reference to FIG. 5, the specified slave will be used. If the call is determined as time barred at step 325 the call proceeds as if it were a call from an unknown CLI or without CLI being present. However, if the CLI is not recognised as one for which a nominated slave socket 12 exists then the incoming call may be handled in the same manner as if CLI were not present. Assuming that CLI is present and the slave socket has a CLI display 37 then the received information may be transferred by way of the signalling wire and the respective microprocessor 36 (step 335).

The transfer of an incoming call from one extension to another may be achieve using the DTMF receiver 29 and coding so that if the call is answered by a nominated extension the user may key in hash or other nominated signal together with the required extension number to cause microprocessor 15 to reset the call to ring a different extension. Both extensions may remain on line using closed switches SSW2. It is noted that if no reply is detected at step 345 within a specified time period step 350 then the microprocessor 15 will identify the default slave socket as hereinbefore described at step 330 and will seek to divert the call to a different extension.

Programming of the microprocessor 15 (eg at step 197 of FIG. 5) may be achieved from a nominated extension or from a communications instrument directly plugged to the master socket. alternatively, a small keyboard of conventional design could be employed to cause configuration of the microprocessor 15.

The microprocessor 15 may be programmed to remember the CLIs of all calls received such that by stepping through a list of received calls the extension to be nominated for receiving calls in any future call from that CLI may be achieved with a minimum of input.

The microprocessor 15 may also be programmed to effect call barring from nominated extensions in an alternative manner to that previously described. For this reason tone generator 30 may be provided. In this case the microprocessor 15 stores all digits received from the extensions and compares them with a call barring list. If the call is not on the call barring list then switch SW1 may be closed and tone generator 30 used to transmit the digits to the network in known manner. If the call is to a number which is barred to all extensions then the switch SW1 is not closed or is opened to prevent further transmission to a line.

Where selective barring is in use then switch SW1 may remain open while switch SW2 is closed so that the switches SSW2 in slave extensions to which the call is listed as barred can be caused to open thereby preventing transmission to line if on opening of the appropriate SSW2 the line voltage input is restored.

It is further noted that in order to avoid false traffic being passed via the NTE 6 to line 4 a tone generator 30 may be provided so that calls from any extension are made on a tone repeated basis if required.

In addition to the features specified above, it will be appreciated that further features may be incorporated on a selectable or timed basis in respect of each of the slave extensions 12. Thus for example incoming calls may be prevented from ringing an extension 7 in a child's bedroom after a particular specified time and/or outgoing call barring may be applied to prevent external calls from being made.

As hereinbefore described, total barring or selectable barring of certain calls may be applied to specified extensions. In addition specified coding may be used to prevent calls to international or premium rate services. Such barring will be carried out as hereinbefore described by the microprocessor examining dialled digits prior to or in parallel with closing SW1.

Specified inter-extension calls may also be barred such that calls from one child's bedroom to another child's bedroom may be prohibited after a specified time or selectively from the master control socket 11.

It will be appreciated that the system may also be used to record details of calls made from the customer premises to the network such that by use of a suitable modem and printer or tone interpretation or display apparatus, the microprocessor 15 may be interrogated to determine the time, duration and destination of calls originated from each of the extensions.

I claim:

1. A telecommunications switch arrangement, comprising:
   a master control unit including a first pair of terminals for connection to a line of a telephone exchange;
   at least one slave control unit;
   a second pair of terminals switchably connected to the first pair of terminals under control of a processor of the master control unit and connected to each slave control unit, said connection being a speech pair for telephone calls;
   said master control unit and said at least one slave control unit being connected by a further pair of wires, one wire of the further pair of wires being a signaling line and another wire of the further pair of wires being a ringing line switchably connected to a ringing generator under control of the master control unit processor; and
   each slave control unit being responsive to signals from said master control unit on said signaling wire to selectively connect output terminals of the slave control unit to said ringing wire and to said speech pair.

2. The telecommunications switching arrangement as claimed in claim 1, including at least two slave control units, wherein said master control unit is responsive to signals from telephone apparatus connected to terminals of one of said slave control units to cause another of said slave control units to effect connection of said output terminals to said ringing wire and to said speech pair.

3. The telecommunications switching arrangement as claimed in claim 2, wherein the master control unit causes signaling on said signaling wire to cause more than one of said slave control units to effect connection between the ringing wire and a respective output terminal.

4. The telecommunications switching arrangement as claimed in claim 2, wherein the processor of said master control unit is responsive to network signals generated by a telephone network and passed on by said telephone exchange to said master control unit, said network signals identifying a source of an incoming call, said master control unit selectively causing a respective one of said slave units to effect a connection between the ringing wire and its respective output terminal.

5. The telecommunications switching arrangement as claimed in claim 4, wherein the master control unit is responsive to a non-answer condition from one of said at least two slave control units to transfer a received call to another of said at least two slave control units.

6. The telecommunications switching arrangement as claimed in claim 4, wherein the master control unit causes signaling on said signaling wire to cause more than one of said slave control units to effect connection between the ringing wire and a respective output terminal.

7. The telecommunications switching arrangement as claimed in claim 2, wherein said master control unit is responsive to a non-answered condition from a first one of said at least two slave control units to transfer a received call to a predetermined other one of said at least two slave control units.

8. The telecommunications switching arrangement as claimed in claim 4, wherein the master control unit is arranged to transmit signals corresponding to the source identification signals to an activated slave control unit.

9. The telecommunications switch arrangement as claimed in claim 8, wherein the activated slave control unit is adapted to cause the source of the connected call to be displayed.

10. The telecommunications switch arrangement as claimed in claim 4, wherein the master control unit is programmed selectively to bar the setting up of calls to particular destinations from particular associated telephone extensions.

11. The telecommunications switch arrangement as claimed in claim 4, wherein the master control unit is programmed to prohibit setting up of calls between particular associated extension instruments.

12. The telecommunication switch arrangement as claimed in claim 11, wherein on detection of an attempt to make a call that is prohibited the call is directed to an alternative extension instrument.

13. The telecommunications switch arrangement as claimed in claim 10, wherein the prohibition may be time dependent.

* * * * *